(12) United States Patent
Fischer

(10) Patent No.: US 6,296,430 B1
(45) Date of Patent: Oct. 2, 2001

(54) PUSH-IN PLUG

(75) Inventor: Rainer Fischer, Waldachtal (DE)

(73) Assignee: Fischerwerke Artur Fischer GmbH & co. KG, Waldachtal (DE)

( * ) Notice: Subject to any disclaimer, the term of this patent is extended or adjusted under 35 U.S.C. 154(b) by 0 days.

(21) Appl. No.: 09/581,835

(22) PCT Filed: Oct. 19, 1998

(86) PCT No.: PCT/EP98/06613

§ 371 Date: Jun. 14, 2000

§ 102(e) Date: Jun. 14, 2000

(87) PCT Pub. No.: WO99/33153

PCT Pub. Date: Jul. 1, 1999

(30) Foreign Application Priority Data

Dec. 19, 1997 (DE) ................................ 197 56 764

(51) Int. Cl.$^7$ ........................... F16B 13/04; F16B 13/06
(52) U.S. Cl. .................... 411/33; 411/77; 411/78; 411/510; 411/913
(58) Field of Search ............................ 411/32, 33, 78, 411/79, 80, 77, 508, 509, 510, 913

(56) References Cited

U.S. PATENT DOCUMENTS

| | | | |
|---|---|---|---|
| 3,257,891 | * | 6/1966 | Lerich ................................. 411/79 |
| 4,633,640 | * | 1/1987 | Hutter ............................... 411/33 X |
| 5,498,108 | * | 3/1996 | Frandberg ......................... 411/78 X |
| 5,743,061 | * | 4/1998 | Rolph ............................... 411/510 X |

FOREIGN PATENT DOCUMENTS

| | | |
|---|---|---|
| 641 253 | 2/1984 | (CH) . |
| 83 28 369 | 11/1983 | (DE) . |
| 83 28 369.2 | 1/1984 | (DE) . |
| 93 05 667.2 | 7/1993 | (DE) . |
| 196 07 516 | 10/1997 | (DE) . |
| 35 16 922 | 10/1997 | (DE) . |
| 196 28 557 A1 | 1/1998 | (DE) . |
| 196 28 558 A1 | 1/1998 | (DE) . |
| 0 479 416 | 4/1992 | (EP) . |
| 2 276 193 | 9/1994 | (GB) . |

* cited by examiner

*Primary Examiner*—Neill Wilson
(74) *Attorney, Agent, or Firm*—Michael J. Stiker

(57) ABSTRACT

The invention relates to a push-in plug (1) made from plastics and having at least one shank (2) to be introduced into a drilled hole, on which shank (2) there are located expansion segments (4) lying opposite one another in pairs, which are braced against and wedge against the wall of the drilled hole when a tensile force acts on the shank (2). For improvement of the holding force, the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1).

10 Claims, 2 Drawing Sheets

PUSH-IN PLUG

BACKGROUND OF THE INVENTION

The invention relates to a push-in plug.

Printed Specification G 83 28 369.2 discloses a push-in plug used for fastenings especially in electrical engineering for the purpose of fastening cables. In that push-in plug, the holding force is not based on the expansion effect of a screw that is screwed into the plug but is produced by displaceable expansion segments.

In the region of their connection to the shank of the push-in plug, those expansion segments have a narrowed or waisted region such that there is formed perpendicular to the longitudinal axis of the shank an axis of articulation, around which the segments are rotated when the push-in plug is inserted into a drilled hole of a diameter smaller than the width of the push-in plug. When the plug is inserted into the drilled hole, the material of the push-in plug located in the region of the axis of articulation accordingly produces a relatively small restoring force, which in turn provides a small frictional force between, on the one hand, the expansion segments and, on the other hand, the wall of the drilled hole in the anchoring substrate.

When the push-in plug anchored in that manner in the drilled hole is acted upon by the weight of the article being fastened or other tensile loads, the said frictional force, which is dependent on the contact force and the coefficient of friction between the expansion segments and the wall of the drilled hole, results in a moment that produces, in a direction against that of the load, an effect of drawing up the push-in plug, which clamps the plug in the drilled hole when the load is applied and, as a result, increases its holding force. Push-in plugs having a central shank which has such expansion segments mounted on both sides are known, as are also push-in plugs in the form of a U-shaped clip, the legs of which bear such expansion segments on the outside.

The decisive advantage of such push-in plugs lies in their simple installation; it is necessary only to drill a hole in the anchoring substrate and to insert the push-in plug into the drilled hole. Installation times and costs for a screw such as in the case of conventional plugs are no longer applicable. Because the push-in plug does not need to hold a screw, the connection to a holding element, for example for enclosing a cable, can be configured freely.

The disadvantage of the known construction lies in the small restoring force in the region of the axis of articulation and consequently in the correspondingly small frictional force between the expansion segments and the wall of the drilled hole. When external circumstances are unfavourable, for example when the wall of the drilled hole is very smooth and when the drilled hole has a diameter in the upper tolerance range, there are practically no appreciable frictional effects produced between the wall of the drilled hole and the expansion segments so that it is not possible for the desired drawing-up effect to be produced and consequently only an inadequate force holding the plug against external tensile loads is produced. A further disadvantage of the known push-in plugs can be seen in the fact that, even when there is a sufficient drawing-up effect and, consequently, good clamping of the plug in the drilled hole, the maximum pull-out values that can be achieved are then limited by the shearing strength of the axis of articulation, which is of relatively slender construction.

The problem underlying the invention is therefore to provide a push-in plug that, besides the known advantages of being simple to install and not requiring a screw to expand the plug, has higher holding forces under all conditions of use.

That problem is solved by the features of claim 1.

In contrast to the known solution, in which the holding force is produced by the drawing-up effect of the expansion segments, the solution according to the invention achieves a wedging action of the expansion segments that becomes greater as the tensile load increases, as a result of the wedge element's running up the inclined surface formed on the shank.

When the push-in plug is pushed into the drilled hole, the individual wedge elements of the expansion segments are displaced towards the mouth of the drilled hole so that the wedge elements arrive at a position on the shank that is in front of the inclined surface. After the push-in plug has been fully inserted into the drilled hole and when a tensile load is applied to the shank of the push-in plug, the wedge elements are displaced towards the insertion end of the shank by virtue of their friction on the outer surface of the wall of the drilled hole so that they slide up the rising inclined surface and become wedged in the drilled hole. That enforced wedging results in very high holding forces, even in the case of drilled holes that prove to be slightly on the large side. Tolerances in drilled holes are compensated by a smaller or slightly greater axial displacement.

The wedge element preferably has a cylindrical cross-section over a portion of its length and is arranged transverse to the longitudinal direction of the shank. In order to achieve advantageous contact with the wall of the drilled hole it is suitable to provide the outer surface of the wedge element with a rounded form matched to the diameter of the drilled hole.

The wedge element is integrally joined to the shank by means of an injection-moulded bridge having a right-angled shape. Such a connection allows both the axial displacement towards the mouth of the drilled hole when the push-in plug is introduced into the drilled hole and also the axial displacement for the purpose of wedging the push-in plug in place. The injection-moulded bridge also gives rise to a restoring force which ensures that a preliminary wedging action occurs as soon as the push-in plug has been introduced into the drilled hole, even without a tensile load acting on the shank.

A plurality of pairs of expansion segments lying opposite one another are suitably arranged one behind another on the shank. In order to ensure that all the expansion segments grip uniformly, it is advantageous for the expansion segments arranged one after another to be interconnected by means of a bridge.

In a further practical form, for better taking up of transverse forces and for supporting the push-in plug in the region of the mouth of the drilled hole, two longitudinal ribs, which are located opposite one another and engage in the drilled hole, can be arranged at the rear end remote from the insertion end. The rear end of the push-in plug may have a flange for fastening articles by push-through mounting. For cable fastenings, however, it is advantageous for the cable holder to be integrally formed directly on the rear end of the push-in plug in the form of a clasp or clip.

In a further practical form, the push-in plug according to the invention may have two shank elements each having expansion segments arranged on the outer surface, the two shank elements forming the legs of a U-shaped clip, the base portion of which forms a holder. In that practical form, it is also advantageous to provide the inner surfaces of the two shank elements with ribbing, preferably in the form of transverse ribs, in the region of the expansion segments.

BRIEF DESCRIPTION OF THE DRAWINGS

Embodiments of the invention are illustrated in the drawing, in which.

DESCRIPTION OF THE PREFERRED EMBODIMENTS

Figure 1:
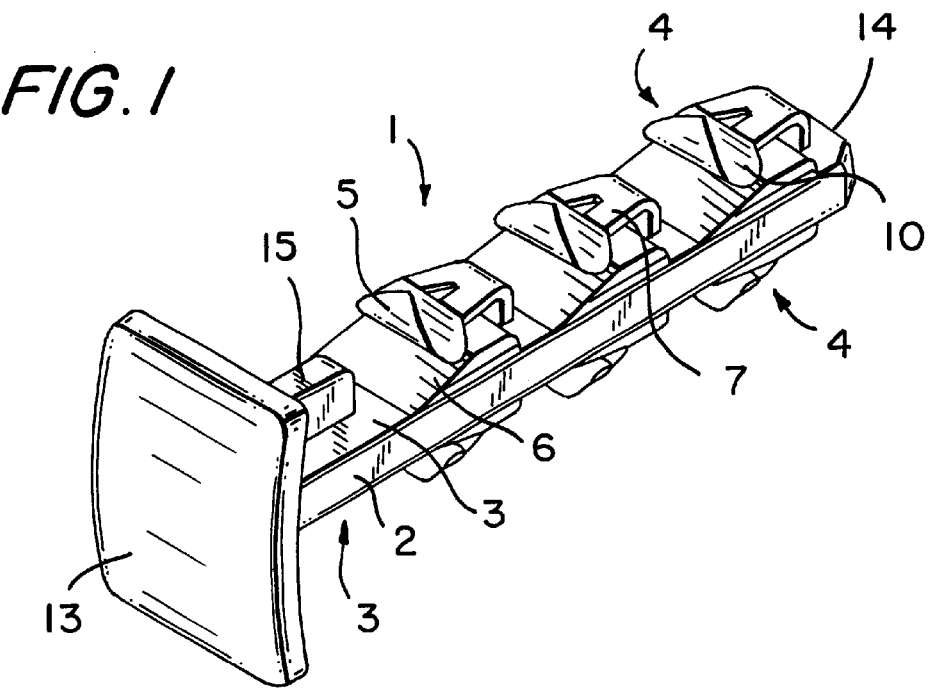
FIG. 1 shows a perspective view of a push-in plug having a flange.

The embodiment illustrated in FIG. 1 shows a push-in plug 1, which is made from plastics by injection moulding and has an elongate shank 2 of a flat shape, on the outer surfaces 3 of which there are arranged expansion segments 4 lying opposite one another in pairs. An expansion segment 4 is formed by a wedge element 5 and an inclined surface 6 formed on the outer surface 3 of the shank 2. The wedge element 5 is joined to the shank 2 by means of an injection-moulded bridge 7 having a rightangled shape in such a manner that, when the push-in plug is pushed into a drilled hole, the wedge element 5 is displaced axially towards the mouth of the drilled hole to a position in front of the inclined surface 6. As a result, the outer dimension defined by the two wedge elements 5 lying opposite one another is compressed to an outer dimension corresponding to the diameter of the hole 8 drilled in the masonry 9 (see FIG. 2). In order to ensure that, between the wedge element 5 and the wall of the drilled hole, there is contact over an area, the outward-facing surfaces of the wedge elements 5, which have a cylindrical cross-section, are provided with a rounded form 10 corresponding to the diameter of the drilled hole.

Figure 2:
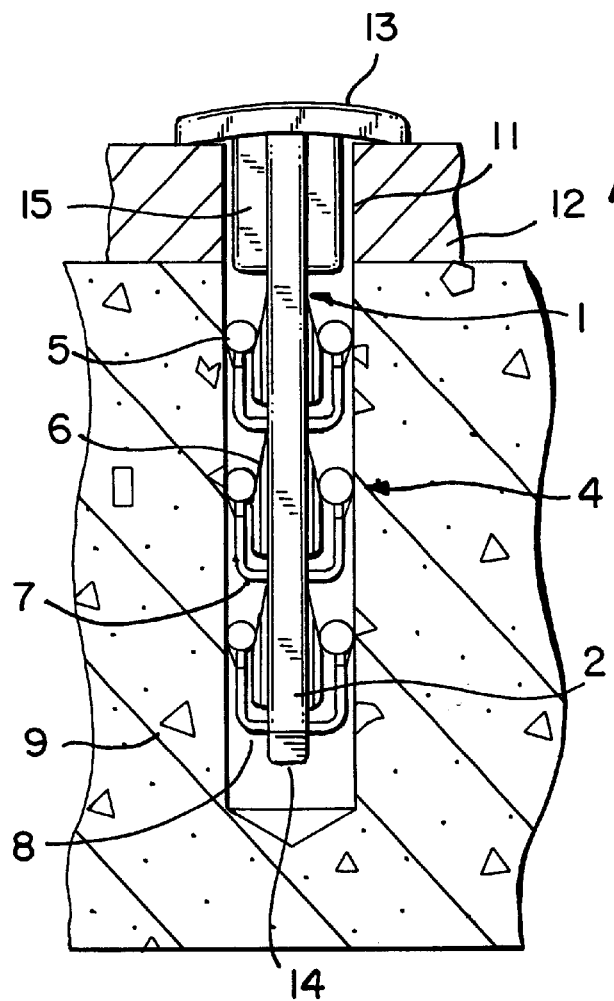
FIG. 2 shows the push-in plug according to FIG. 1 anchored in a drilled hole.

In FIG. 2, the push-in plug 1 illustrated in FIG. 1 is shown in the installed state. The push-in plug 1 has three pairs of expansion segments 4, each pair consisting of two expansion segments 4 lying opposite one another. For the purpose of installing the push-in plug 1, it is pushed through the bore 11 in the article 12 being fastened and into the drilled hole 8 until the flange 13 arranged at the rear end of the push-in plug 1 comes to rest against the outer surface of the article 12 being fastened. The restoring force of the injection-moulded bridge 7, on the one hand, and a tensile load resulting from the weight of the article 12 being fastened, on the other hand, cause the wedge element 5 to be displaced along the inclined surface 6 formed on the shank 2 towards the insertion end 14 of the push-in plug 1 until wedging in the drilled hole 8 occurs. For supporting the push-in plug I in the bore 11 of the component 12 being fastened and in the region of the mouth of the drilled hole, there are arranged on the shank 2 two longitudinal ribs 15 located opposite one another, the outer dimension of which corresponds approximately to the diameter of the drilled hole.

Figure 3:
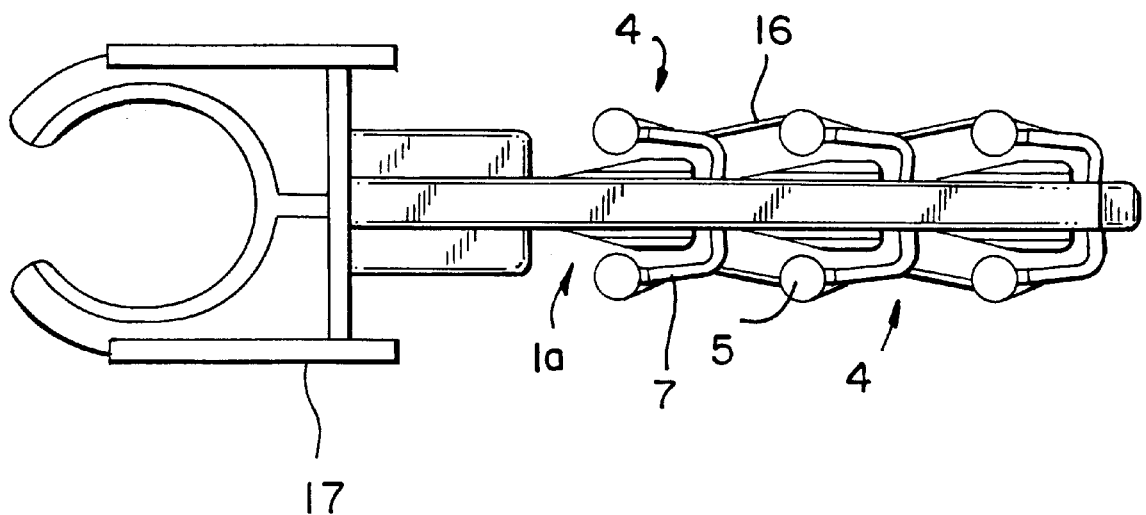
FIG. 3 shows a modified embodiment of the push-in plug having an integrally formed holder.

FIG. 3 shows a modified embodiment 1a of the push-in plug in which the expansion segments 4 arranged one after another are interconnected by means of an injection-moulded thread-like member 16 leading from the wedge element 5 to the injection-moulded bridge 7. By that means, uniform expansion of all three pairs of expansion segments 4 is achieved. The embodiment according to FIG. 3 has, instead of a flange 13, a holder 17 configured as a cable clasp.

Figure 4:
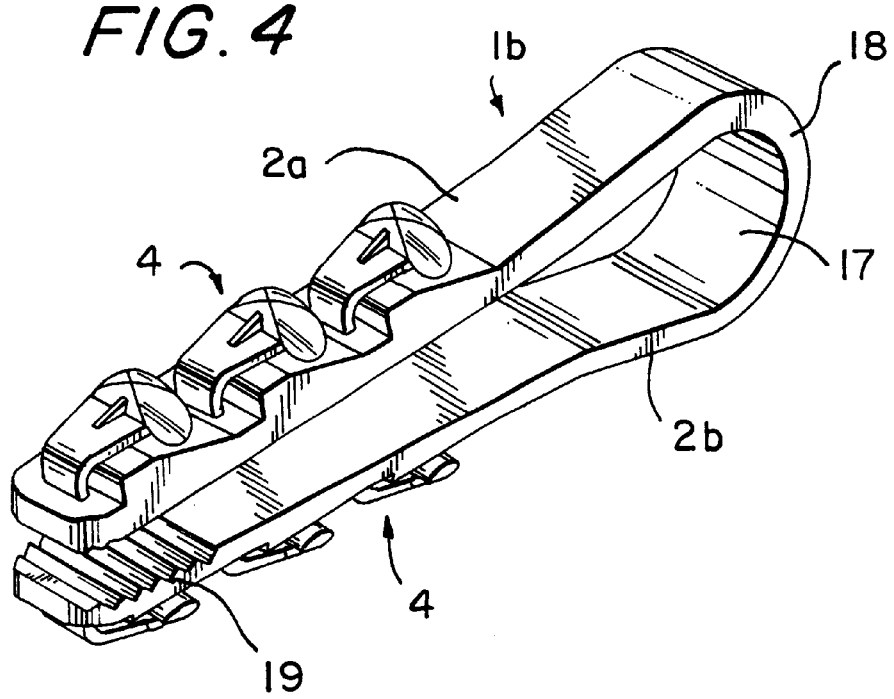
FIG. 4 shows a further modified embodiment of the push-in plug having two shank elements forming a U-shaped clip.

FIG. 4 shows a variant of the push-in plug 1b, which has two shank elements 2a, 2b each having expansion segments 4 arranged on the outer surface. The two shank elements 2a, 2b form the legs of a U-shaped clip, the base portion 18 of which forms a holder 17 located outside the drilled hole. In order to avoid relative displacement of the two shank elements 2a, 2b, a portion of the inner surfaces of the two shank elements 2a, 2b is provided with ribbing 19 in the form of transverse ribs in the region of the expansion segments. Ribbing can also be provided on the outer surfaces of the wedge elements 5—not illustrated.

What is claimed is:

1. Push-in plug made from plastics and having at least one shark (2) to be introduced into a drilled hole, on which shank (2) there are located expansion segments (4) lying opposite one another in pairs, which are braced against and wedge against the wall of the drilled hole when a tensile force acts on the shank (2), the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1), the wedge element (5) is arranged transverse to the longitudinal direction of the shank (2), the outer surface of the wedge element (5) has a rounded form match to the diameter of the drilled hole, and the wedge element is integrally joined to the shank (2) by means of an injection-molded bridge (7).

2. Push-in plug according to 1, wherein the wedge element (5) has a cylindrical cross-section over a portion of its length.

3. Push-in plug according to claim 1, characterized in that at least two pairs of expansion segments (4) lying opposite one another are arranged one behind another on the shank (2).

4. Push-in plug naccording to claim 1, wherein the end of the push-in plug (1) remote from the insertion end (14) has a flange (13) and/or a holder (17).

5. Push-in plug made from plastics and having at least one shark (2) to be introduced into a drilled hole, on which shank (2) there are located expansion segments (4) lying opposite one another in pairs, which are braced against and wedge against the wall of the drilled hole when a tensile force acts on the shank (2), the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1), the wedge element (5) is arranged transverse to the longitudinal direction of the shank (2), and the outer surface of the wedge element (5) has a rounded form (10) matched to the diameter of the drilled hole.

6. Push-in plug made from plastics and having at least one shark (2) to be introduced into a drilled hole, on which shank (2) there are located expansion segments (4) lying opposite one another in pairs, which are braced against and wedge against the wall of the drilled hole when a tensile force acts on the shank (2), the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1), the wedge element (5) is arranged transverse to a longitudinal direction of the shank (2), and the wedge element (5) is integrally joined to the shank (2) by means of an injection molded bridge (7).

7. Push-in plug made from plastics and having at least one shark (2) to be introduced into a drilled hole, on which shank (2) there are located expansion segments (4) lying opposite one another in pairs, which are braced against and wedge against the wall of the drilled hole when a tensile force acts on the shank (2), the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1), at least two pairs of expansion segments (4) lying opposite one another are arranged one behind another on the shank (2), the expansion segments (4) arranged one behind another are interconnected by means of an injection-molded thread-like member (16).

8. Push-in plug made from plastics and having at least one shark (2) to be introduced into a drilled hole, on which shank (2) there are located expansion segments (4) lying opposite one another in pairs, which are braced against and wedge against the wall of the drilled hole when a tensile force acts on the shank (2), the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1), and at the end of the shank (2) remote from the insertion end (14) there are arranged two longitudinal ribs (14), which are located opposite one another and engage in the drilled hole.

9. Push-in plug made from plastics and having at least one shark (2) to be introduced into a drilled hole, on which shank (2) there are located expansion segments (4) lying opposite one another in pairs, which are braced against and wedge against the wall of the drilled hole when a tensile force acts on the shank (2), the expansion segment (4) is formed by a wedge element (5), which is held on the outer surface (3) of the shank (2) so as to be axially displaceable and which is displaced, when the push-in plug (1) is pushed into the drilled hole, into a position lying in front of an inclined surface (6) formed on the shank (2), which inclined surface (6) rises towards the insertion end (14) of the push-in plug (1), and the push-in plug (1) has two shank elements (2a, 2b) each having expansion segments (4) arranged on the outer surface, the two shank elements (2a, 2b) forming the legs of a U-shaped clip, the base portion (18) of which forms a holder (17).

10. Push-in plug to claim 9, wherein a portion of the inner surfaces of the two shank elements (2a, 2b) has ribbing (19) in the form of transverse ribs in the region of the expansion segments (4).

* * * * *